Jan. 11, 1927.

J. G. UTZ 1,613,683

HOUSING SUPPORT FOR MOTOR VEHICLES

Filed Feb. 2, 1925

Inventor

JOHN G. UTZ

By

Attorney

Patented Jan. 11, 1927.                                                    1,613,683

UNITED STATES PATENT OFFICE.

JOHN G. UTZ, OF DETROIT, MICHIGAN, ASSIGNOR TO THE WARFORD CORPORATION, OF NEW YORK, N. Y., A CORPORATION OF NEW YORK.

HOUSING SUPPORT FOR MOTOR VEHICLES.

Application filed February 2, 1925. Serial No. 6,471.

It is the primary object of my improved device to provide a cross member support for motor vehicles adapted to assist in carrying the weight of transmission housings and particularly auxiliary transmission housings, such as are commonly used on a well-known type of automobile. In the construction of the type of automobile for which my invention is particularly adapted, radius rods are provided for taking certain shocks and strains, and the interposing of a cross member support for such a construction would ordinarily destroy the functions of such radius rods. I have, therefore, provided my support with loose attachments to the frame side members so as to provide for a certain restricted longitudinal movement, and have also disposed coil springs at the connections of the cross member to the frame members so as to provide a restricted vertical movement for the cross member. At the point where the cross member is attached to the transmission housing, I have made provision, by the utilization of pivoted supporting lugs, for a restricted transverse movement of the housing relative to the cross member.

I have, therefore, at one and the same time, made provision for supporting an auxiliary transmission and at the same time allowing for vertical transverse and fore and aft movement so as not to interfere with the function of radius rods.

With the above fundamentals as the primary object of my invention, my invention consists in the arrangement, combination and construction of the various parts of my improved device as described in the specification, claimed in my claims and shown in the accompanying drawings, in which:

Figure 1:
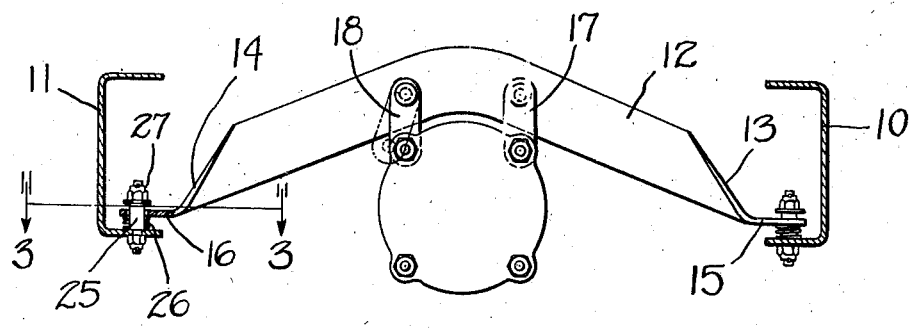
Fig. 1 is a transverse sectional view of a pair of automobile frame members showing the end of an auxiliary transmission housing and my cross member support.

I have shown a pair of frame side members 10 and 11, between which is interposed a sheet metal cross member 12, set edgewise and twisted adjacent each end thereof, as at 13 and 14, so as to provide flat attaching ends 15 and 16.

At approximately the center of the cross member 12, I provide a pair of spaced lugs 17 and 18 which are loosely riveted, as at 19 and 20 respectively, to the cross members so that they may pivot on the cross member. The opposite ends of the lugs 17 and 18 are bolted to the rear of an auxiliary transmission housing 21 by the bolts 22 and 23, such as are ordinarily used for bolting the end plate of the transmission housing in place. The pivoting of the lugs 17 and 18 not only permits a restricted transverse movement of the transmission housing, relative to the cross member, but also permits of better alignment of the openings in the lugs with the bolts 22 and 23 for assembly purposes.

Provided in the frame members 10 and 11 adjacent the ends 15 and 16 of the cross member are apertures 24, through which bolts 25 are adapted to extend. It will be noted that the openings 24 are slightly larger than the bolts 25 so as to provide a loose connection permitting restricted fore and aft movement of the cross member relative to the frame.

In the form of my invention as disclosed in Fig. 1 a coil spring 26 is disposed around the bolt 25 on the top of the bottom flange of the cross members 10 and 11, and the cross member 12 is apertured to fit over the bolt 25 and rest upon the spring 26, the nuts 27 holding the cross member against displacement. The spring 26 permits of a restricted vertical movement of the cross member relative to the frame side members.

Figure 2:
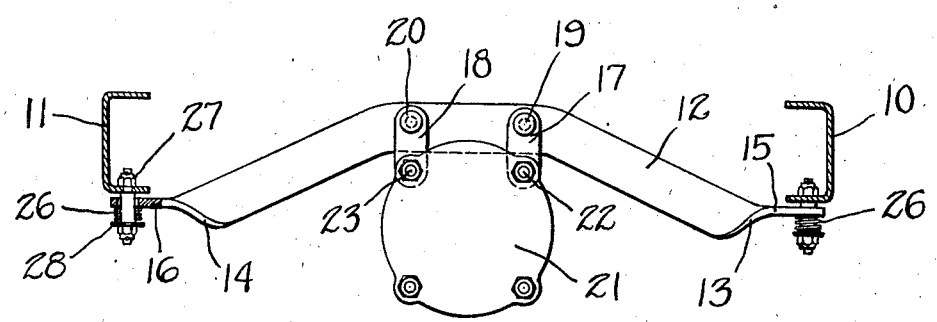
Fig. 2 is a similar view showing a slightly modified form of my invention.
Figure 3:
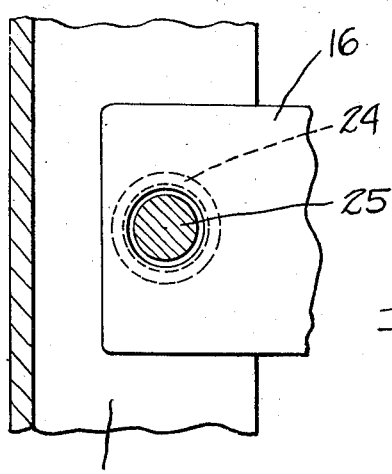
Fig. 3 is a sectional view taken on line 3—3 of Fig. 1.

In the form of my invention disclosed in Fig. 2, the spring 26 is disposed around the bolt 25, below the bottom flange of the spring cross members, a washer 28 being provided under the bottom of the spring to secure it in place and the ends of the cross member 12 are disposed over the bolts 25 so that they may rest upon the springs 26 beneath the bottom flange of the frame cross members, the nuts 27 on the ends of the bolts being positioned on the top of the bottom flanges of the frame side members so that cross bar 12 is suspended from the bottom of the frame side members.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. A device of the class described, comprising in combination, a motor vehicle frame and a transmission housing, an arched crossbar disposed between and movably secured at its ends, to the frame side members, lugs intermediate the ends of said crossbar and movably secured thereto and also movably secured to the transmission housing and supporting same.

2. A device of the class described, comprising in combination, a motor vehicle frame and a transmission housing, an arched pressed metal crossbar of greater width than thickness, disposed between the frame side members, with the arched portion of said crossbar disposed vertically to the plane of said frame side members, and the ends of said crossbar twisted and disposing their width upon the horizontal surface of the said frame side members, and movably secured thereto, lugs movably secured at their end to said crossbar intermediate the ends thereof, with the other ends of said lugs movably secured to the transmission housing and supporting the same beneath said crossbar.

3. In a transmission housing support for a motor vehicle, the combination of spaced frame side members of a motor vehicle, an arched crossbar disposed between said frame side members and movably secured thereto at its ends, lugs movably secured to said crossbar intermediate the ends thereof, a transmission housing movably secured to said lugs and suspended thereby from said crossbar.

JOHN G. UTZ.